Dec. 10, 1935.  J. JANCE  2,024,042
SAFETY DEVICE
Filed Sept. 12, 1935
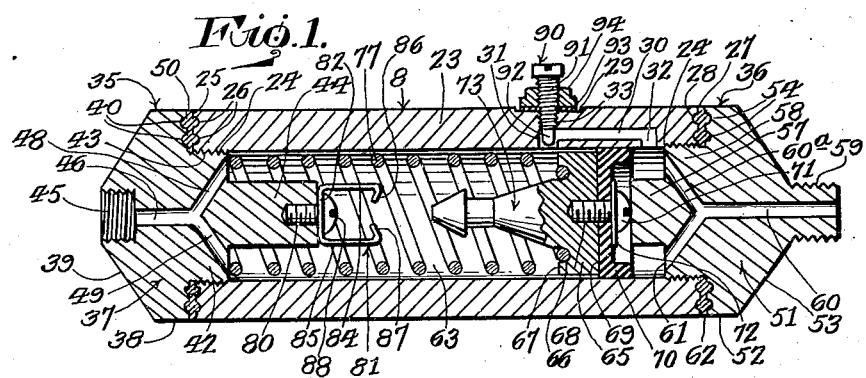
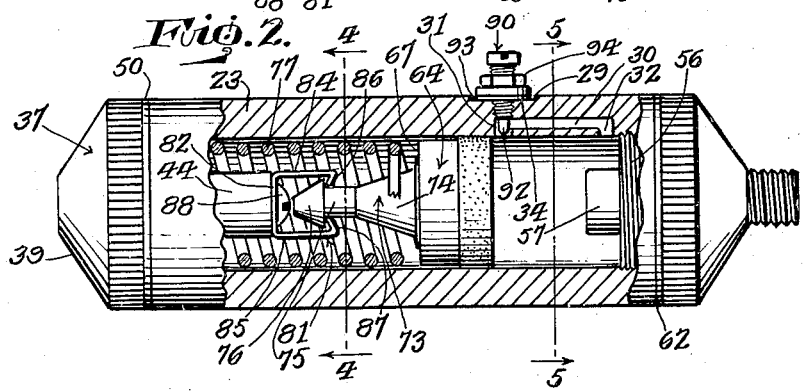
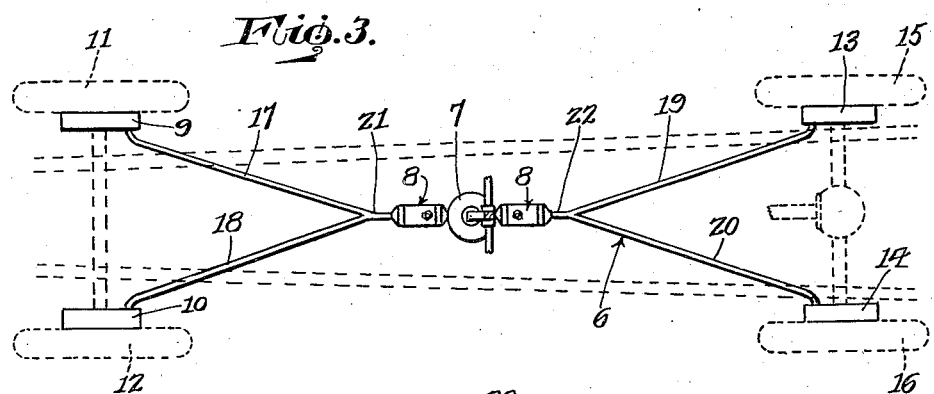
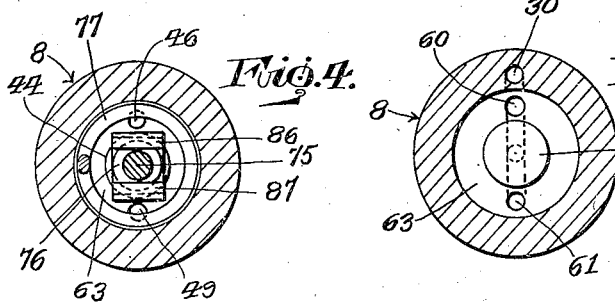
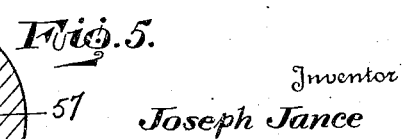
Inventor
Joseph Jance
Geo. F. Kimmel
Attorney Patented Dec. 10, 1935

2,024,042

UNITED STATES PATENT OFFICE 2,024,042

SAFETY DEVICE

Joseph Jance, Detroit, Mich.

Application September 12, 1935, Serial No. 40,313

8 Claims. (Cl. 303—84)

This invention relates to a safety device designed primarily for use in connection with hydraulic brakes of the four-wheel type for automotive vehicles, but it is to be understood that a safety device, in accordance with this invention, may be employed in any connection for which it may be found applicable, and the invention has for its object to provide, in a manner as hereinafter set forth, a safety device when forming a part of a hydraulic braking system for the front and rear wheels of an automotive vehicle, to interrupt the flow of fluid through any conduit of the system leading to a brake unit when a break or leak develops in the conduit, so that a waste of fluid from the system is prevented and the danger of the entire braking system being rendered inoperative obviated.

A further object of the invention is to provide, in a manner as hereinafter set forth, means for interposition in a hydraulic braking system for the front and rear wheels of an automotive vehicle which acts to, when a break or leak is in that part of the system leading to the braking units of the front wheels of the vehicle or in that part of the system leading to the braking units of the rear wheels of the vehicle, provide for the operativeness of the system with respect to that part of the parts aforesaid in which the break or leak is not present.

A further object of the invention is to provide, in a manner as hereinafter set forth, a safety device for the purpose referred to having coacting interengaging parts interengaging within and intermediate the ends thereof and providing a positive solid latch for maintaining the piston of the device in safety position for the purpose to insure positive safety against the action of the pressure on the piston which generally amounts to about eight hundred pounds.

A further object of the invention is to provide, in a manner as hereinafter set forth, a safety device for the purpose referred to including a piston cylinder having the body thereof provided with a by-pass of a form to prevent the material weakening of said body.

A further object of the invention is to provide, in a manner as hereinafter set forth, a safety device for the purpose referred to including a pressure actuated piston and means for applying pressure against the follower face of the piston at spaced points of the latter and adjacent its axis to facilitate the shifting and to prevent any possible tilting or binding action of the piston when it is to be shifted by the application of pressure to its follower face.

A further object of the invention is to provide, in a manner as hereinafter set forth, a safety device for the purpose referred to including a piston cylinder having its body formed with a by-pass and a controlling valve for the latter constructed in a manner to permanently provide a small leakage from the discharge end of the by-pass to compensate for wear on the brake units and to equalize the pressure on the piston.

Further objects of the invention are to provide, in a manner as hereinafter set forth, a safety device for the purpose referred to which is simple in its construction and arrangement, strong, durable, compact, readily installed in a hydraulic braking system, thoroughly efficient in its use, conveniently assembled, formed of connected elements permitting of an impaired element being detached and a non-impaired element substituted therefor without discarding the non-impaired elements and comparatively inexpensive to manufacture.

With the foregoing and other objects which may hereinafter appear, the invention consists of the novel construction, combination and arrangement of parts as will be more specifically described and as are illustrated in the accompanying drawing, wherein is shown an embodiment of the invention, but it is to be understood that changes, variations and modifications may be resorted to which fall within the scope of the invention as claimed.

In the drawing:

Figure 1 is a longitudinal sectional view of the device in inactive position,

Figure 2 is a longitudinal sectional view of the device in active or safety position, Figure 3 is a plan view of a hydraulic braking system as applied with respect to the front and rear wheels, front and rear axles and the chassis of an automotive vehicle and showing the installation of a pair of safety devices, in accordance with this invention, relative to the system. The front and rear wheels, front and rear axles and chassis of the vehicle are indicated in dotted lines, Figure 4 is a section on line 4—4, Figure 2, and Figure 5 is a section on line 5—5, Figure 2.

With reference to Figure 3, a hydraulic braking system having interposed therein a pair of safety devices, in accordance with this invention, and installed relative to the brake units of the wheels of an automotive vehicle, is generally indicated at 6. The system includes a primary master cylinder 7 of known form, front and rear oppositely disposed auxiliary master cylinders or safety devices 8, each of which corresponds to the construction of the safety device in accordance with this invention, brake units 9, 10 for the front wheels 11, 12 respectively of the vehicles, brake units 13, 14 for the rear wheels 15, 16 respectively of the vehicle, a pair of forwardly extending, oppositely, outwardly inclined fluid conduits 17, 18 opening at their forward ends into the brake units 9, 10 respectively, a pair of rearwardly extending, oppositely, outwardly inclined fluid conduits 19, 20 opening at their rear ends into the brake units 13, 14 respectively, a front fluid conducting pipe 21 common to and opening at one end into the rear ends of the conduits 17, 18 and at its other end into the forward end of the front auxiliary master cylinder 8 and a rear fluid conducting pipe 22 common to and opening at one end into the forward ends of the conduits 19, 20 and at its other end into the rear end of the rear auxiliary master cylinder 8. The rear end of the front auxiliary master cylinder and the forward end of the rear auxiliary master cylinder are connected for communication with the bottom of the primary master cylinder 7 by suitable, permanently open pipe connections, not shown. The said pipe connections may be in the form of an inverted T and with the stem of the T opening into cylinder 7 through the bottom of the latter.

Each auxiliary master cylinder or safety device 8 includes a horizontally disposed cylindrical member 23 open at each end and formed on its inner face, at each end terminal portion of the latter, with a body of threads 24. The outer end edge 25 of member 23 is formed with a pair of concentrically arranged spaced circular grooves 26. The inner end edge 27 of member 23 is provided with a pair of concentrically arranged spaced circular grooves 28. The outer periphery of member 23, in proximity to end edge 27, is formed with a recess 29. The body of member 23 is formed lengthwise thereof with an inverted U-shaped channel 30 which constitutes a by-pass. The side branches 31, 32 of the channel 30 open at the inner face of member 23. The body of member 23 is formed with a threaded opening 33 which opens at its outer end at the center of the base 34 of recess 29 and at its inner end opening into the upper end of branch 31. The channel 30 is disposed between the transverse median and the end edge 27 of member 23. The branch 31 is spaced from one side of the transverse median and the branch 32 is spaced from the end edge 27 of member 23. The length and arrangement of channel 30 in the body of member 23 does not weaken said body to a material extent.

There is associated with the forward and rear ends of member 23 front and rear one-piece closure heads 35, 36 respectively of circular cross section. The head 35 includes an outer portion 37 formed of an inner part 38 and a tapered outer end part 39. The part 38 corresponds in diameter to the outer diameter and opposes the outer end of member 23. The inner face of part 38 is formed with a pair of spaced concentric circular grooves 40. The head 35 includes an intermediate extension 42 integral with and projecting inwardly from the inner face of head portion 37. The extension 41 is disposed in concentric relation to head portion 37, is peripherally threaded, as at 43, and is of a diameter corresponding to the inner diameter of member 23. The head 35 includes an inner extension 44 of greater length and of less diameter than that of extension 42. The extension 44 is integral with the inner end of, is arranged concentric relative to and projects inwardly from the inner end of extension 42. The tapered outer end part 39 of head portion 37 is formed axially thereof with a threaded socket 45 for connecting thereto the front pipe 21. The head 35 is provided axially thereof with a fluid supply port 46 for the pipe 21 and which opens at one end into the socket 45 through the base 47 of the latter. The port 46 extends from the base of socket 45 and partly through the extension 42. The port 46 is common to and has its other end open into the forward ends of a pair of oppositely outwardly inclined fluid conducting ports 48, 49 which open at the inner end of extension 42 adjacent the extension 44. The extensions 42, 44 are arranged in the outer end portion of the member 23. The extension 44 has threaded engagement with the threads 24 at the outer end terminal portion of the inner face of member 23. Mounted on the extension 44 is an annular resilient sealing gasket 50 which is interposed between the inner face of head portion 37 and the end edge 25 of member 23. When the head 35 is screwed home to closure position with respect to the front end of member 23, the gasket 50 is compressed and portions of the latter extend into the grooves 26 and 40 to set up a fluid tight joint or seal between head 35 and member 23.

The head 36 includes an outer portion 51 formed of an inner part 52 and a tapered outer end part 53. The part 52 corresponds in diameter to the outer diameter and opposes the inner end of member 23. The inner face of part 52 is formed with a pair of spaced concentric circular grooves 54. The head 36 includes an intermediate extension 55 integral with and projecting inwardly from the inner face of head portion 51. The extension 55 is disposed in concentric relation to the head portion 51, is peripherally threaded, as at 56, and is of a diameter corresponding to the inner diameter of member 23. The head 36 includes an inner extension 57 of less length and diameter than that of extension 55. The extension 57 is integral with the inner end of, is arranged concentric relative to and projects inwardly from the inner end of extension 55. The tapered outer end part 53 of the head portion 51, at its apex, is formed with an outwardly directed peripheral coupling nipple 59 for connecting the safety device 8 to the pipe connection, not shown, which opens into the master cylinder 7. The head 36 is formed axially thereof with a fluid intake port 60 which opens at one end into the nipple 58. The port 60 extends through head portion 51 and into the extension 55. The port 60 is common to and opens into the outer ends of a pair of oppositely outwardly inclined fluid conducting ports 60ª, 61 which open at the inner face of extension 55 adjacent to the extension 57. The extensions 55, 57 are arranged in the inner end portion of member 23. The extension 55 has threaded engagement with the threads 24 at the inner end terminal portion of member 23. Mounted on the extension 55 is an annular resilient sealing gasket 62 which is interposed between the inner face of head portion 50 and the end edge 27 of member 23. When the head 36 is screwed home to closure position with respect to the inner end of member 23, the gasket 62 is compressed and portions of the latter extend into the grooves 28 and 54 to set up a fluid tight joint or seal between head 36 and member 23.

The member 23 coacts with the heads 35, 36 to provide a piston chamber 63.

Arranged within the chamber 63 is a spring controlled fluid pressure operated circular piston 64 formed of a head 65 having an annular groove 66 in its leading face 67. The head 65, axially thereof, has a threaded socket 68 which opens at the follower face 69 of the head 65. Positioned against the follower face 69 of head 65 is a rearwardly opening cup-shaped resilient packing washer 70 which is anchored to head 65 by a screw 71 having threaded engagement with the wall of socket 68. Interposed between the head of screw 71 and washer 70 is a washer 72. The washer 70 and the head 65 have a snug sliding fit with the inner face of member 23. Extending from the leading face 67 of the head 65 is a latching bolt 73 formed of a frusto-tapered rear part 74, an intermediate part 75 of uniform diameter and a frusto-tapered head 76. The part 74 has its rear end integral with and disposed concentric to the leading face 67 of head 65. The forward end of part 74 merges into and is of the same diameter as that of the rear end of part 75. The forward end of the part 75 is disposed concentric to, merges into and is of materially less diameter than the rear end of the head 76. The rear face of the head 76 coacts with a keeper, to be referred to, for positively latching the piston 64 with head 35 against the action of a controlling spring 77 for the piston. The spring 77 surrounds the extension 44 and bolt 73, is seated at one end in the groove 66, has its other end bearing against the inner face of the extensions 42 and its side bearing against the inner face of member 23. The spring normally tends to maintain the piston 64 clear of latching engagement with the head 35, such as shown in Figure 1, and which is the inactive position of the safety device.

The extension 44, axially thereof, is formed with a threaded socket 80 opening at the inner end thereof. Positioned against the inner end of extension 44 is a keeper 81 for the latching bolt 73. The keeper consists of an upstanding apertured base 82 and a pair of spaced resilient parallel resilient latching arms 84, 85 formed with oppositely disposed inwardly inclined rear end terminal portions 86, 87 respectively. The arms 84, 85 are integral respectively with the upper and lower ends of, are disposed at right angles to said extend inwardly from base 82. The arms 84, 85 are arranged in superposed relation. The base 82 is anchored against the inner end of extension 44 by a screw 88 extending through base 82 and engaging in the socket 80.

Threadedly engaging with the opening 33 is an adjustable controlling valve 90 for the channel or by-pass 30. The valve 90 is of the tapered plug type and includes a threaded outer portion 91 and a non-threaded reduced portion 92 of a diameter to permanently provide for a slight leakage into the piston chamber 63 forwardly of piston 64 when the safety device is in inactive position, such as shown in Figure 1. The inner portion 92 of valve 90 is arranged in the branch 31 of channel 30. The leakage is had through branch 31. Mounted in the recess 29 is a packing member or gasket 93 through which extends the valve 90. Carried by the latter is a locking nut 94 for the valve which bears against member 93. This arrangement provides to compensate for wear in the brake units and to equalize the pressure on opposite faces of the piston.

If one of the fluid conduits coupled with the head portion 37 of head 35 breaks or is provided with a leak causing a leakage of fluid, the pressure is reduced on the leading face 67 of the piston whereby the pressure applied to the follower face of the piston will shift the latter towards the head 35 to an extent to have the head 76 of the latching bolt extend between the arms 84, 85 whereby the end terminal portions 86, 87 will coact with the follower or rear face of the head 76 and positively lock the piston in a position forwardly of the by-pass.

What I claim is:

1. In a safety device for hydraulic braking systems for the front and rear wheels of an automotive vehicle, a secondary master cylinder adapted to be interposed in the system between the primary master cylinder and the fluid conduits leading to the braking units for the front or rear wheels of the vehicle, said secondary master cylinder including a tubular member and outer and inner closure heads for the ends of said member coacting with the latter to provide a piston chamber, said outer and inner heads having fluid conducting means permanently opening respectively into said conduits and the master cylinder, each head including an intermediate and an inner extension arranged in stepped relation and disposed in said chamber, a spring controlled pressure actuated piston within said chamber, slidable against the inner face of said member, arranged between said inner extensions and formed with a latching bolt axially of its leading face extended towards the inner extension of the outer head, said bolt being formed with a head, said member being formed with a valve controlled by-pass having end branches opening into said chamber at spaced points of the latter, said by-pass being arranged between the transverse median and the inner end of said member, and a keeper carried by the inner extension of the outer head and engageable with the rear face of the head of said bolt for positively locking said bolt to retain the piston forwardly of said by-pass when pressure is reduced in one or both of said conduits to prevent the passage of fluid to the conduits.

2. In a safety device for hydraulic braking systems for the front and rear wheels of an automotive vehicle, a secondary master cylinder adapted to be interposed in the system between the primary master cylinder and the fluid conduits leading to the braking units for the front or rear wheels of the vehicle, said secondary master cylinder including a tubular member and outer and inner closure heads for the ends of said member coacting with the latter to provide a piston chamber, said outer and inner heads having fluid conducting means permanently opening respectively into said conduits and the master cylinder, each head including an intermediate and an inner extension arranged in stepped relation and disposed in said chamber, a spring controlled pressure actuated piston within said chamber, slidable against the inner face of said member, arranged between said inner extensions and formed with a latching bolt axially of its leading face extended towards the inner extension of the outer head, said bolt being formed with a head, said member being formed with a valve controlled by-pass having end branches opening into said chamber at spaced points of the latter, said by-pass being arranged between the transverse median and the inner end of said member, and a keeper carried by the inner extension of the outer head and engageable with the rear face of the head of said bolt for positively locking said bolt to retain the piston forwardly of said by-pass when pressure is reduced in one or both of said conduits to prevent the passage of fluid to the conduits, the controlling spring for said piston being arranged in said chamber and interposed between the inner extension of said outer head and the leading face of the piston.

3. In a safety device for hydraulic braking systems for the front and rear wheels of an automotive vehicle, a secondary master cylinder adapted to be interposed in the system between the primary master cylinder and the fluid conduits leading to the braking units for the front or rear wheels of the vehicle, said secondary master cylinder including a tubular member and outer and inner closure heads for the ends of said member coacting with the latter to provide a piston chamber, said outer and inner heads having fluid conducting means permanently opening respectively into said conduits and the master cylinder, each head including an intermediate and an inner extension arranged in stepped relation and disposed in said chamber, a spring controlled pressure actuated piston within said chamber, slidable against the inner face of said member, arranged between said inner extensions and formed with a latching bolt axially of its leading face extended towards the inner extension of the outer head, said bolt being formed with a head, said member being formed with a valve controlled by-pass having end branches opening into said chamber at spaced points of the latter, said by-pass being arranged between the transverse median and the inner end of said member, and a keeper carried by the inner extension of the outer head and engageable with the rear face of the head of said bolt for positively locking said bolt to retain the piston forwardly of said by-pass when pressure is reduced in one or both of said conduits to prevent the passage of fluid to the conduits, the fluid conducting means in each of said heads consisting of an axially arranged port having its inner end opening in a pair of oppositely disposed outwardly inclined ports opening at the inner end of the intermediate extension and adjacent the inner extension of the head.

4. In a safety device for hydraulic braking systems for the front and rear wheels of an automotive vehicle, a secondary master cylinder adapted to be interposed in the system between the primary master cylinder and the fluid conduits leading to the braking units for the front or rear wheels of the vehicle, said secondary master cylinder including a tubular member and outer and inner closure heads for the ends of said member coacting with the latter to provide a piston chamber, said outer and inner heads having fluid conducting means permanently opening respectively into said conduits and the master cylinder, each head including an intermediate and an inner extension arranged in stepped relation and disposed in said chamber, a spring controlled pressure actuated piston within said chamber, slidable against the inner face of said member, arranged between said inner extensions and formed with a latching bolt axially of its leading face extended towards the inner extension of the outer head, said bolt being formed with a head, said member being formed with a valve controlled by-pass having end branches opening into said chamber at spaced points of the latter, said by-pass being arranged between the transverse median and the inner end of said member, and a keeper carried by the inner extension of the outer head and engageable with the rear face of the head of said bolt for positively locking said bolt to retain the piston forwardly of said by-pass when pressure is reduced in one or both of said conduits to prevent the passage of fluid to the conduits, said member and intermediate extensions having coacting means for anchoring the heads to said member.

5. In a safety device for hydraulic braking systems for the front and rear wheels of an automotive vehicle, a secondary master cylinder adapted to be interposed in the system between the primary master cylinder and the fluid conduits leading to the braking units for the front or rear wheels of the vehicle, said secondary master cylinder including a tubular member and outer and inner closure heads for the ends of said member coacting with the latter to provide a piston chamber, said outer and inner heads having fluid conducting means permanently opening respectively into said conduits and the master cylinder, each head including an intermediate and an inner extension arranged in stepped relation and disposed in said chamber, a spring controlled pressure actuated piston within said chamber, slidable against the inner face of said member, arranged between said inner extensions and formed with a latching bolt axially of its leading face extended towards the inner extension of the outer head, said bolt being formed with a head, said member being formed with a valve controlled by-pass having end branches opening into said chamber at spaced points of the latter, said by-pass being arranged between the transverse median and the inner end of said member, a keeper carried by the inner extension of the outer head and engageable with the rear face of the head of said bolt for positively locking said bolt to retain the piston forwardly of said by-pass when pressure is reduced in one or both of said conduits to prevent the passage of fluid to the conduits, said member having each end formed with circular concentrically arranged grooves, said heads intermediate their ends being formed with circular concentrically arranged grooves aligning with the said other grooves, sealing means encompassing said intermediate extensions and interposed between said heads and said member, and said intermediate extensions and members having coacting parts for anchoring the heads to said member, for clamping said sealing means in position and to provide for parts of the sealing means filling said grooves.

6. In a safety device for hydraulic braking systems for the front and rear wheels of an automotive vehicle, a secondary master cylinder adapted to be interposed in the system between the primary master cylinder and the fluid conduits leading to the braking units for the front or rear wheels of the vehicle, said secondary master cylinder including a tubular member and outer and inner closure heads for the ends of said member coacting with the latter to provide a piston chamber, said outer and inner heads having fluid conducting means permanently opening respectively into said conduits and the master cylinder, each head including an intermediate and an inner extension arranged in stepped relation and disposed in said chamber, a spring controlled pressure actuated piston within said chamber, slidable against the inner face of said member, arranged between said inner extensions and formed with a latching bolt axially of its leading face extended towards the inner extension of the outer head, said bolt being formed with a head, said member being formed with a valve controlled by-pass having end branches opening into said chamber at spaced points of the latter, said by-pass being arranged between the transverse median and the inner end of said member, a keeper carried by the inner extension of the outer head and engageable with the rear face of the head of said bolt for positively locking said bolt to retain the piston forwardly of said by-pass when pressure is reduced in one or both of said conduits to prevent the passage of fluid to the conduits, each of said heads having an outer end portion, the outer end portion of the outer head being formed axially thereof with a threaded socket opening into the fluid conducting means of such head, and the outer end portion of the inner head being formed axially thereof with a lateral nipple opening into the fluid conducting means of such head.

7. In a safety device for hydraulic braking systems for the front and rear wheels of an automotive vehicle, a secondary master cylinder adapted to be interposed in the system between the primary master cylinder and the fluid conduits leading to the braking units for the front or rear wheels of the vehicle, said secondary master cylinder including a tubular member and outer and inner closure heads for the ends of said member coacting with the latter to provide a piston chamber, said outer and inner heads having fluid conducting means permanently opening respectively into said conduits and the master cylinder, each head including an intermediate and an inner extension arranged in stepped relation and disposed in said chamber, a spring controlled pressure actuated piston within said chamber, slidable against the inner face of said member, arranged between said inner extensions and formed with a latching bolt axially of its leading face extended towards the inner extension of the outer head, said bolt being formed with a head, said member being formed with a valve controlled by-pass having end branches opening into said chamber at spaced points of the latter, said by-pass being arranged between the transverse median and the inner end of said member, and a keeper carried by the inner extension of the outer head and engageable with the rear face of the head of said bolt for positively locking said bolt to retain the piston forwardly of said by-pass when pressure is reduced in one of both of said conduits to prevent the passage of fluid to the conduits, the said keeper comprising a base anchored to the inner end of the inner extension of the outer head and a pair of superposed resilient arms having angularly disposed rear end terminal portions for engaging the rear face of the head of the bolt.

8. In a safety device for hydraulic braking systems for the front and rear wheels of an automotive vehicle, a secondary master cylinder adapted to be interposed in the system between the primary master cylinder and the fluid conduits leading to the braking units for the front or rear wheels of the vehicle, said secondary master cylinder including a tubular member and outer and inner closure heads for the ends of said member coacting with the latter to provide a piston chamber, said outer and inner heads having fluid conducting means permanently opening respectively into said conduits and the master cylinder, each head including an intermediate and an inner extension arranged in stepped relation and disposed in said chamber, a spring controlled pressure actuated piston within said chamber, slidable against the inner face of said member, arranged between said inner extensions and formed with a latching bolt axially of its leading face extended towards the inner extension of the outer head, said bolt being formed with a head, said member being formed with a valve controlled by-pass having end branches opening into said chamber at spaced points of the latter, said by-pass being arranged between the transverse median and the inner end of said member, a keeper carried by the inner extension of the outer head and engageable with the rear face of the head of said bolt for positively locking said bolt to retain the piston forwardly of said by-pass when pressure is reduced in one or both of said conduits to prevent the passage of fluid to the conduits, and a threaded controlling valve for said by-pass located at the forward end branch of the latter and being formed with an inner portion to provide for a permanent leakage of fluid from the by-pass into said chamber.

JOSEPH JANCE.